US006389014B1

(12) United States Patent
Song

(10) Patent No.: US 6,389,014 B1
(45) Date of Patent: May 14, 2002

(54) ATM SWITCHING DEVICE AND METHOD CAPABLE OF PROVIDING VOICE CALL SERVICE

(75) Inventor: Doug-Young Song, Kyonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/095,743

(22) Filed: Jun. 11, 1998

(30) Foreign Application Priority Data

Jun. 11, 1997 (KR) .......................................... 97/24032

(51) Int. Cl.⁷ .......................... H04L 12/50; H04Q 11/00
(52) U.S. Cl. ...................... 370/376; 370/356; 370/465; 370/395.61
(58) Field of Search ........................ 370/352, 376–378, 370/395, 465, 473, 474, 375, 353, 354.356, 395.61, 395.1

(56) References Cited

U.S. PATENT DOCUMENTS

| 5,144,619 | A | 9/1992 | Munter | 370/353 |
|---|---|---|---|---|
| 5,168,492 | A | 12/1992 | Beshai et al. | 370/353 |
| 5,173,901 | A | 12/1992 | DeSomer | 370/353 |
| 5,204,857 | A | 4/1993 | Obara | 370/354 |
| 5,301,189 | A | 4/1994 | Schmidt et al. | 370/356 |
| 5,359,600 | A | 10/1994 | Ueda et al. | 370/399 |
| 5,390,184 | A | 2/1995 | Morris | 370/353 |
| 5,421,025 | A | 5/1995 | Yamada et al. | 709/246 |
| 5,483,527 | A | 1/1996 | Doshi et al. | 370/399 |
| 5,568,475 | A | 10/1996 | Doshi et al. | 370/399 |
| 5,570,355 | A | 10/1996 | Dali et al. | 370/352 |
| 5,577,037 | A | 11/1996 | Takatori et al. | 370/395.7 |
| 5,805,588 | A | * 9/1998 | Peterson | |
| 5,841,771 | A | * 11/1998 | Irwin et al. | 370/360 |
| 5,894,477 | A | * 4/1999 | Brueckheimer et al. | 370/353 |
| 5,917,824 | A | * 6/1999 | Brueckheimer et al. | 370/397 |
| 5,953,330 | A | * 9/1999 | Canniff et al. | |
| 6,023,465 | A | * 2/2000 | Brueckheimer et al. | 370/386 |
| 6,151,320 | A | * 11/2000 | Shim | |

* cited by examiner

*Primary Examiner*—Chau Nguyen
*Assistant Examiner*—Inder Pal Mehra
(74) *Attorney, Agent, or Firm*—Robert E. Bushnell, Esq.

(57) ABSTRACT

An ATM switching device and method for providing voice call service. In the ATM switching device, input time switch modules are connected to an input PSTN interface to switch channel data received over sub-highways to voice stream data grouped in accordance with destinations by sorting the received channel data according to time slots corresponding to numbers of destination time switch modules. Input cell assembly and disassembly modules are connected to the input time switch modules to assemble a group of voice data headed for the same destination into an identical ATM cell. An ATM switch is connected to the input cell assembly and disassembly modules and to an ATM interface to self-route the ATM cell, to switch the ATM cell, and to output the switched ATM cell to a corresponding destination. Destination cell assembly and disassembly modules disassemble the ATM cell received from the ATM switch into voice stream data. Output time switch modules are connected between the destination cell assembly and disassembly modules and a destination PSTN interface to interchange time slots of the disassembled voice stream data according to destinations, and to output each of the time-slot interchanged voice stream data to a corresponding PSTN destination interface.

21 Claims, 10 Drawing Sheets

ATM SWITCHING DEVICE AND METHOD CAPABLE OF PROVIDING VOICE CALL SERVICE

CLAIM FOR PRIORITY

This application makes reference to, incorporates the same herein, and claims all benefits accruing under 35 U.S.C. §119 from an application for ATM SWITCHING DEVICE AND METHOD CAPABLE OF PROVIDING VOICE CALL SERVICE earlier filed in the Korean Industrial Property Office on Jun. 11, 1997, and there duly assigned Serial No. 24032/1997, a copy of which application is annexed hereto.

BACKGROUND OF THE INVENTION

1. Technical Field

The present invention relates to asynchronous transfer mode (ATM) switching device, and in particular, relates to an ATM switching device and method capable of providing voice call service.

2. Related Art

Generally, ATM is a specific packet-oriented transfer mode using an asynchronous time division multiplexing technique where both circuit switching and packet switching are unified and many pieces of data information such as voice, video, and data are organized in fixed-sized blocks, called cells. ATM can operate as both a packet exchange system and a circuit exchange system in one transmission mode for efficiently embodying both high speed and wide band communication networks. For this reason, ATM is a target transfer mode solution for implementing a broadband integrated services digital network (B-ISDN) because it offers an effective information channel management, and serves to decrease the costs of broad-band communication network facilities because of its flexibility in a bandwidth distribution.

ATM technology has since been implemented for broadband-integrated service digital networks (B-ISDN) to provide service for a wide variety of applications such as voice, video, and data. Each of these applications has different service requirements in terms of cell loss and cell delay. For example, voice traffic can withstand a small amount of cell loss, but it is intolerant to cell delay. Video traffic can typically tolerate a small amount of cell loss, but it is sensitive to cell delay. Data traffic can withstand a considerable amount of cell delay, but it is intolerant to cell loss. Voice service for ATM network remains a challenge because an ATM switch relies on a different voice data transmission from that of a currently used circuit switch. Therefore, an additional function for accommodating voice data must be provided to the ATM switch during its transition period. Recent studies have been conducted to provide voice service for subscribers connected to a public switched telephone network (PSTN) through interworking functions between the PSTN and an ATM network. However, cell delay and the decrease of bandwidth efficiency involved in assembling voice data output from the PSTN into an ATM cell still remain problems.

There have been some proposals of an ATM network using both a STM (i.e., Synchronous Transfer Mode) switch which is ideal for voice service and an ATM switch to simultaneously provide general circuit switching and ATM switching. Some examples of these ATM networks are disclosed in U.S. Pat. No. 5,173,901 for Communication System For Transmitting Synchronous And Asynchronous Cell Streams Over A Single Transmission Link issued to DeSomer, U.S. Pat. No. 5,204,857 for ATM Exchange System issued to Obera, U.S. Pat. No. 5,301,189 for Telecommunication Network Having ATM Switching Centers And STM Switching Centers issued to Schmidt et al., U.S. Pat. No. 5,483,527 for Terminal Adapter For Interfacing An ATM Network With A STM Network issued to Doshi et al., U.S. Pat. No. 5,568,475 for ATM Network Architecture Employing An Out-Of-Band Signal Network issued to Doshi. Generally, such ATM networks are designed to concurrently provide STM and ATM with common hardware and software platform, and accommodate any of an STM node, an ATM node, and an STM/ATM composite node. However, I have observed that there are a number of drawbacks. For example, both STM and ATM switches are required to implement STM and ATM switchings independently. Traffic control is complex and a large traffic load between the STM and ATM switches may cause a bottleneck. Cells are typically delayed, and the delay in assembling voice data into a cell has an adverse influence on voice quality. Lastly, cell bandwidth efficiency is decreased.

Other proposals to minimize the drawbacks of typical ATM networks are disclosed, for example, in U.S. Pat. No. 5,144,619 for Common Memory Switch For Routing Data Signals Comprising ATM And STM Cells issued to Munter, U.S. Pat. No. 5,168,492 for Rotating-Access ATM-STM Packet Switch issued to Beshai et al., U.S. Pat. No. 5,359,600 for High Throughput Supervisory System For ATM Switching Systems Transporting STM-N Signals issued to Ueda et al., and U.S. Pat. No. 5,390,184 for Flexible Scheduling Mechanism For ATM Switches issued to Morris, and U.S. Pat. No. 5,577,037 for Method Of Processing Inclusively STM Signals And ATM Signals And Switching System Employing The Same issued to Takatori et al. For example, Munter '619 proposes the use of a single ATM switch for handling both ATM and STM traffic. An STM signal is first packetized, which may be time consuming, and is then processed in the similar manner to an ATM signal. A switching unit operates to switch both the STM signal, which has been packetized, and the ATM signal in accordance with the information that has been written to the respective headers. Morris '184 discloses a flexible scheduling mechanism in an ATM switch for use in lieu of a separate STM switch for handling ATM and STM traffic. Takatori '037 seeks to separately manage both ATM and STM signals to minimize the time delay in packetizing the STM signal for exchange in a single ATM system. While the contemporary proposals for ATM networks to handle both ATM and STM traffic with a single switch contain their own merits, I believe that further improvements for ATM networks to effectively provide general voice service from the PSTN are still necessary.

SUMMARY OF THE INVENTION

Accordingly, it is therefore an object of the present invention to provide an ATM switching device which can concurrently handle both ATM and STM traffic with a single switch.

It is also an object to provide an ATM switching device which can complete routing of both ATM and STM traffic in a single switch.

It is further an object to provide an ATM switching device which can prevent cell transmission delay by assembling voice data of different channels into a cell every frame period.

It is yet another object to provide an ATM switching device which can concurrently process both ATM and STM traffic, and remove a bottle-neck at interworking functions for interworking functioning between STM traffic and ATM traffic by scattering the interworking functions at respective ports of a switch.

These and other objects of the present invention can be achieved by an ATM switching device for providing voice call service. The ATM switching device comprises an input time switch module connected to an input PSTN interface for switching DS0 channel data received over sub-highways to voice stream data grouped in accordance with destinations by sorting the received DS0 channel data according to time slots corresponding to numbers of destination time switch modules. An input cell assembly and disassembly module assembles a group of voice data headed for the same destination into an identical ATM upon receipt from the input time switch module. An ATM switch is connected to the input cell assembly and disassembly module and an ATM interface for self-routing the ATM cell received from the input cell assembly and disassembly module, switching the ATM cell, and outputting the switched ATM cell to a corresponding destination. A destination cell assembly and disassembly module disassembles the ATM cell received from the ATM switch into voice stream data. An output time switch module is connected between the destination cell assembly and disassembly module and a destination PSTN interface for interchanging time slots of the disassembled voice stream data according to destinations, and outputting each of the time-slot interchanged voice stream data to a corresponding PSTN destination interface.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
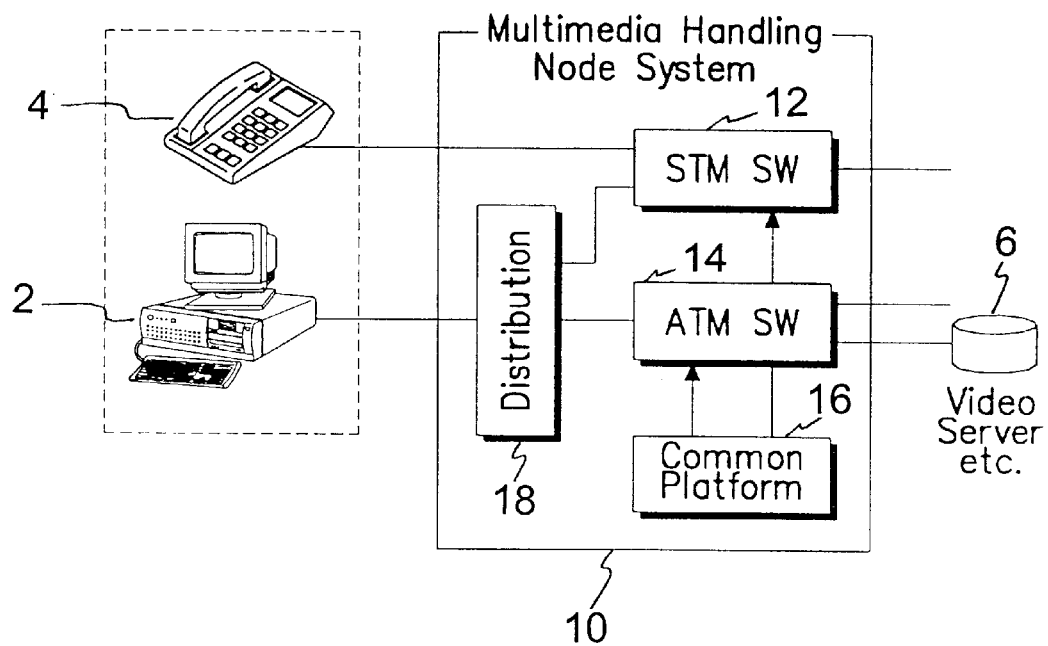
FIG. 1 is a block diagram of an exemplary multimedia handling node system for handling both ATM and STM traffic.

Referring now to the drawings and particularly to FIG. 1, which illustrates an exemplary multimedia handling node (MHN) system as proposed by H. Ohnish et al., of Nippon Telephone & Telegraph (NTT) in "*All Band Switching Node Architecture for Flexible and Cost-Effective Evolution toward B-ISDN*" ISS 1995, B1.2, Japan. As shown in FIG. 1, the MHN system 10 uses both an STM switch 12 and an ATM switch 14 to simultaneously provide general circuit switching and ATM switching between communication devices such as a computer system 2 and a telephone 4, and video servers 6 using a common platform 16 and a distribution module (DSM) 18. A flexible STM-to-ATM converting method is needed for an early-stage B-ISDN because the majority of users are business subscribers, and it is uneconomical to substitute ATM switches for already established STM switches in which an enormous sum of capital has been invested. The MHN system is designed to concurrently handle both ATM and STM with a common hardware and software platform, and accommodate any of an STM node, an ATM node, and an STM/ATM composite node.

Figure 2:
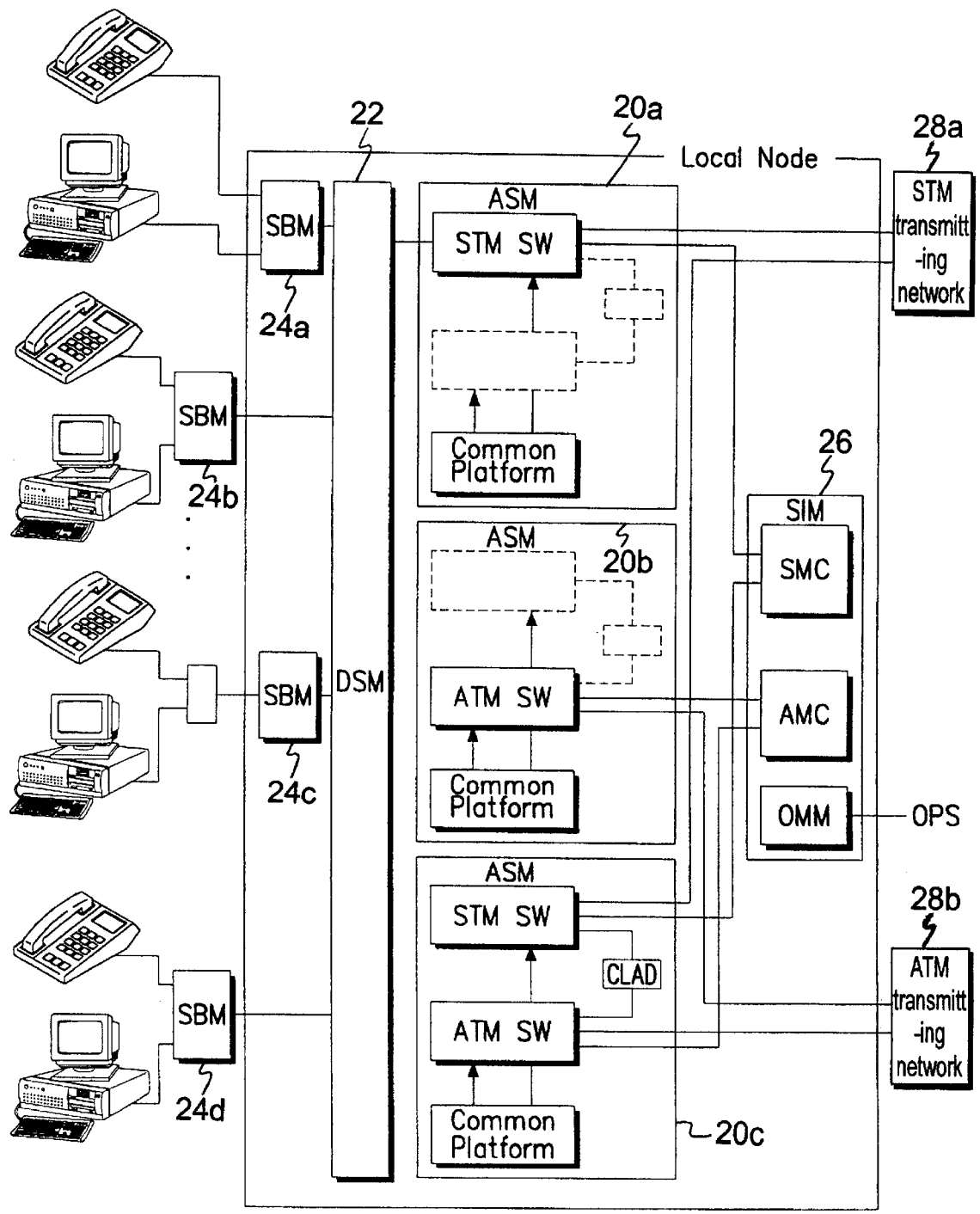
FIG. 2 is a block diagram of a switching device based on the structure shown in FIG. 1.

FIG. 2 illustrates the MHN system in terms of ATM/STM handling modules 20a, 20b, 20c interworking functioned by a cell assembly and disassembly (CLAD). As shown in FIG. 2, the ATM/STM handling modules 20a, 20b, 20c are disposed between a distribution module (DSM) 22 which is connected to a plurality of subscriber modules 24a, 24b, 24c, 24d, and a system interface module (SIM) 26 and both STM transmitting network 28a and ATM transmitting network 28b. However, as noted above, such an MHN system has the following drawbacks:

(1) Both STM and ATM switches are required to implement STM and ATM switchings independently.

(2) The STM and ATM switches need a centralized CLAD, which interworking functions entire traffic between the STM and ATM switches. Thus, traffic control is complex and a large traffic load between the STM and ATM switches may cause a bottle-neck in the interworking function.

(3) Two routings should be performed for cell switching, that is, one from an STM/ATM switch at a transmitter to a CLAD and the other from the CLAD to an ATM/STM switch at a destination.

(4) Cells are delayed. Delay in assembling voice data into a cell has an adverse influence on voice quality. In the case where an ATM cell is filled with voice data (i.e., 64-Kbps digital signal level 0 (DS0) data) transmitted every 125 $\mu$sec in a call connection, before cell transmission, the cell is delayed by about 6 ms, accurately, 5.875 ms. Further, because the delay in voice service generates echo, an echo canceler is required.

(5) Cell bandwidth efficiency is decreased. If only one DS0 data is filled in the ATM cell and then transmitted to prevent the cell delay, the cell bandwidth efficiency is lowered, which still remains unsettled.

Figure 3:
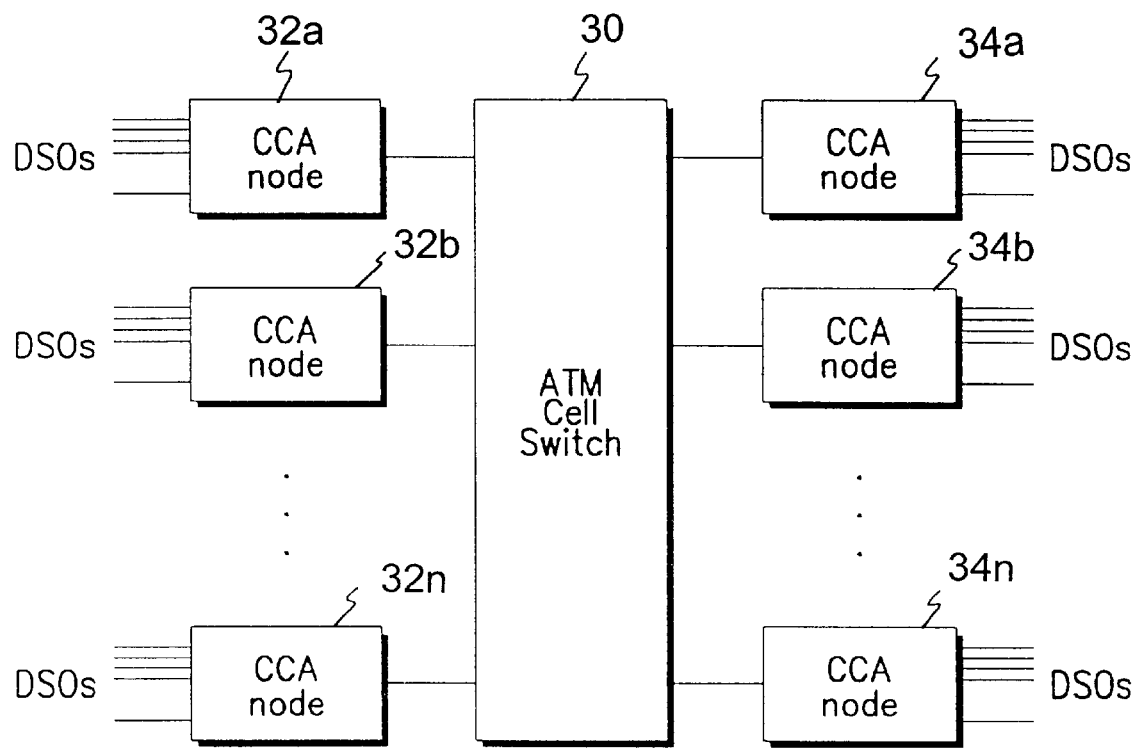
FIG. 3 is a block diagram of a time-cell-time (T-C-T) switch for DS0 voice service.

Another exemplary solution to provide voice service for ATM networks is a time-cell-time (T-C-T) switch system as disclosed by R. Spanke and J. Adrian of AT&T in "*ATM Composite Cell Switching for DS0 Digital Switches*", ISS 1995, P. b3, shown in FIG. 3. The TCT switch system includes an ATM cell switch 30, a plurality of composite cell assembly nodes 32a, 32b . . . 32n at input terminals for receiving digital signal level 0 (DS0) for 64 Kbps, and a plurality of composite cell assembly nodes 34a, 34b . . . 34n at output terminals. However, the TCT switch system of FIG. 3 is merely a concept having no specified implementation for providing a general voice service from the PSTN through an ATM switch.

Figure 4:
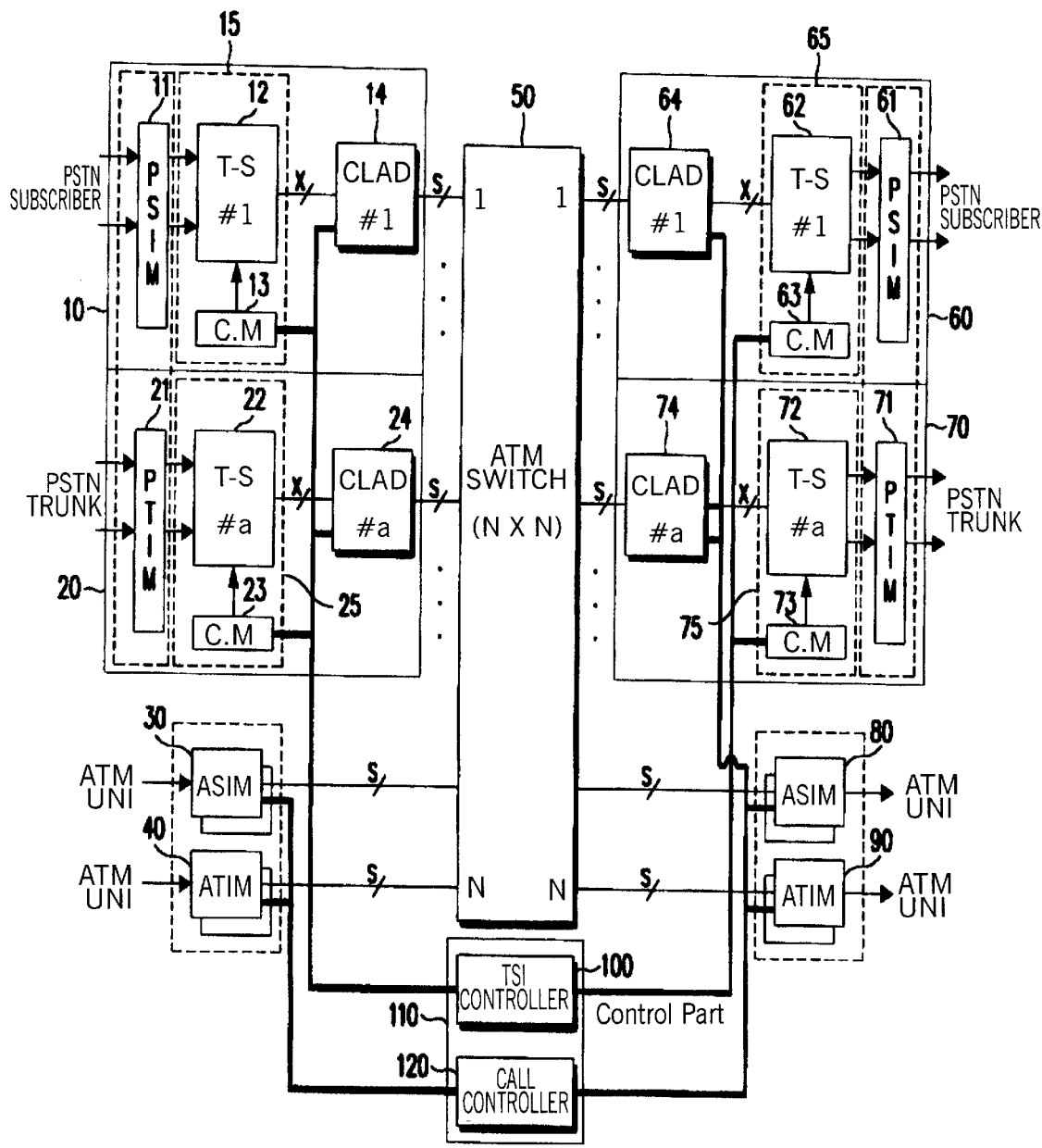
FIG. 4 is a block diagram of an ATM switching device capable of voice call service as constructed according to the principles of the present invention.

FIG. 4 illustrates an ATM switching device constructed according to the principles of the present invention. The ATM switching device can be connected to a PSTN and PSTN subscribers, as well as to an ATM network. An ATM switch realized in the switching device directly provides PSTN voice service. Thus, the ATM switch requires software to implement functions such as call processing for voice switching. Due to its capability of concurrently processing several media in a single switch, the switching device is useful in a transition stage from a PSTN and an N-ISDN (i.e., Narrowband-Integrated Service Digital Network) period to an ATM period, that is, in a stage where new broadband services are on demand for PSTN subscribers in the majority.

The ATM switching device according to an embodiment of the present invention has a new structure, which enables voice call service of PSTN to be provided through an ATM network. In the switching device, a plurality of DS0 voice data streams are received over sub-highways at a rate of 2.0248 Mbps, grouped into channels headed for the same destination group, assembled into cells, and transmitted to a destination module, thereby preventing time delay and a decrease in transfer efficiency during the transmission of voice data in the form of ATM cells. The transmitted cells are time-slot switched at the destination group and sent to their respective destination channels.

As shown in FIG. 4, the ATM switching device includes an ATM switch 50 as a main component. An input device in the ATM switching device includes a PSTN subscriber input module 10, a PSTN trunk input module 20, an ATM subscriber interface module (hereinafter, referred to as "ASIM") 30, and an ATM trunk interface module (hereinafter, referred to as "ATIM") 40. An output device includes a PSTN subscriber output module 60, a PSTN trunk output module 70, an ASIM 80, and an ATIM 90. The pairs of the PSTN subscriber input and output modules 10 and 60, the PSTN trunk input and output modules 20 and 70, the ASIMs 30 and 80, and the ATIMs 40 and 90 have the same structure, respectively. In addition, each pair can be integrated on a single board. The PSTN subscriber and trunk input modules 10 and 20, respectively, and the PSTN subscriber and trunk output modules 60 and 70, respectively, have respective identical time switch modules and CLADs.

The PSTN subscriber input modules 10 and 20 include PSTN subscriber interface modules (hereinafter, referred to as "PSIM") 11 and 21, respectively, connected to PSTN subscriber lines for interfacing between signals output from the PSTN subscribers and the PSTN input subscriber module 10, and a PSTN trunk interface module (hereinafter, referred to as "PTIM") 21 connected to PSTN trunk lines, for interfacing signals input from the PSTN trunk lines and the PSTN trunk input module 20.

Time switch modules 15 and 25 switch voice channels output from the PSIM 11 and PTIM 21, respectively, while time switch modules 65 and 75 switch received voice channels and output the switched voice channels to a PSIM 61 and a PTIM 71, respectively. The time switch modules 15, 25, 65, and 75 include their respective time switches 12, 22, 62, and 72, and control memories 13, 23, 63, and 73, and interchange time slots as in a general circuit switch. Each of the time switches 12, 22, 62, and 72 is provided with a speech memory for storing input voice channel data, and each of the control memories 13, 23, 63, and 73 stores a control address output from a time slot interchange (TSI) controller 100 and generates a channel switching address for a corresponding time switch. Thus, the time switch modules 15, 25, 65, and 75 sequentially store input channel data in the speech memories of the time switches 12, 22, 62, and 72 (sequential write), and switch the voice channel data stored in the speech memories in accordance with control addresses stored in the control memories 13, 23, 63, and 73 (random read).

CLADs 14 and 24 in the PSTN subscriber and trunk input modules 10 and 20 assemble voice channel data received respectively from the time switch modules 15 and 25 in an ATM format, and output the ATM cells to the ATM switch 50. That is, the CLADs 14 and 24 assemble 32-channel voice channel streams respectively output from the time switch modules 15 and 25 into ATM cells by adding headers to the voice channel streams, attach routing tags to the ATM cells, and represent valid data lengths of the ATM cells. CLADs 64 and 74 in the PSTN subscriber and trunk output modules 60 and 70 receive switched ATM cells from the ATM switch 50, disassemble the ATM cells into voice channel data by performing a function opposite to that of CLADs 14 and 24, and then output the voice channel data to the time switch modules 65 and 75.

The ASIM 30 is connected to an ATM UNI for interfacing ATM cells output from ATM subscribers. The ATIM 40 is connected to an ATM NNI for interfacing ATM cells output from ATM trunk lines. ATM cells output from the ASIM 30 and ATIM 40 are connected to the ATM switch 50 without passing through CLADs.

A general ATM switch is used as the ATM switch 50. The ATM switch 50 has input ports connected to the CLADs 14 and 24 of the PSTN subscriber and trunk input modules 10 and 20, to the ASIM 30, and to the ATIM 40, switches input ATM cells, and outputs the switched ATM cells to the PSTN subscriber output module 60, to the PSTN trunk output module 70, to the ASIM 80, and to the ATIM 90.

Pairs of CLADs 64 and 74 connected to the ATM switch 50, and the ASIM 80 and ATIM 90 on the output side, are identical in structure to their respective counterparts, that is, pairs of the CLADs 14 and 24, and the ASIM 30 and ATIM 40 on the input side. In addition, the former operates in a manner opposite to that of the latter. Pairs of the time switch modules 65 and 75, and the PSIM 61 and PTIM 71 on the output side are identical in structure to their respective counterparts, that is, pairs of the time switch modules 65 and 75, and the PSIM 11 and PTIM 21 on the input side. In addition, the former operates in a manner opposite to that of the latter.

The controller 110 controls the time switch modules 15, 25, 65, and 75, and the CLADs 14, 24, 64, and 74, to assemble voice channel stream data into ATM cells, and vice versa. A call controller 120 controls input and output of ATM cells by controlling the ASIMs 30 and 80, and the ATIMs 40 and 90.

Referring to FIG. 4, the PSTN subscriber input module 10 assembles voice data received from PSTN subscribers into ATM cells, and outputs the ATM cells to the ATM switch 50. The ATM switch 50 outputs the ATM cells received from the PSTN subscriber input module 10 to the PSTN subscriber output module 60, the PSTN trunk output module 70, the ASIM 80, or the ATIM 90. The PSTN trunk input module 20 assembles voice data received from PSTN trunk lines into ATM cells, and outputs the ATM cells to the ATM switch 50. The ATM switch 50 outputs the ATM cells received from the PSTN trunk input module 20 to the PSTN subscriber output module 60, the PSTN trunk output module 70, the ASIM 80, or the ATIM 90. The ASIM 30 interfaces ATM cells received from ATM subscribers, and outputs the ATM cells to the ATM switch 50. The ATM switch 50 outputs the ATM cells received from the ASIM 30 to the PSTN subscriber output module 60, the PSTN trunk output module 70, the ASIM 80, or the ATIM 90. The ATIM 40 interfaces ATM cells received from ATM trunk lines, and outputs the ATM cells to the ATM switch 50. The ATM switch 50 outputs the ATM cells received from the ATIM 40 to the PSTN subscriber output module 60, the PSTN trunk output module 70, the ASIM 80, or the ATIM 90.

For the sake of simplicity in describing the embodiment of the present invention, it is assumed that PSTN subscribers are both a source and a destination. Voice data received from the PSTN subscribers is applied to the CLAD 14 through the PSIM 11 and the time switch module 15. The CLAD 14 assembles the voice channel data into an ATM cell, and outputs the ATM cell to an input port of the ATM switch 50. The CLAD 64 at a destination disassembles an ATM cell received from the ATM switch 50 into voice channel data, and applies the voice channel data to the time switch module 65 at the destination. The destination time switch module 65 interchanges time slots of the disassembled voice channel data, and sends the time-slot interchanged voice channel data to the final PSTN subscribers.

Figure 5:
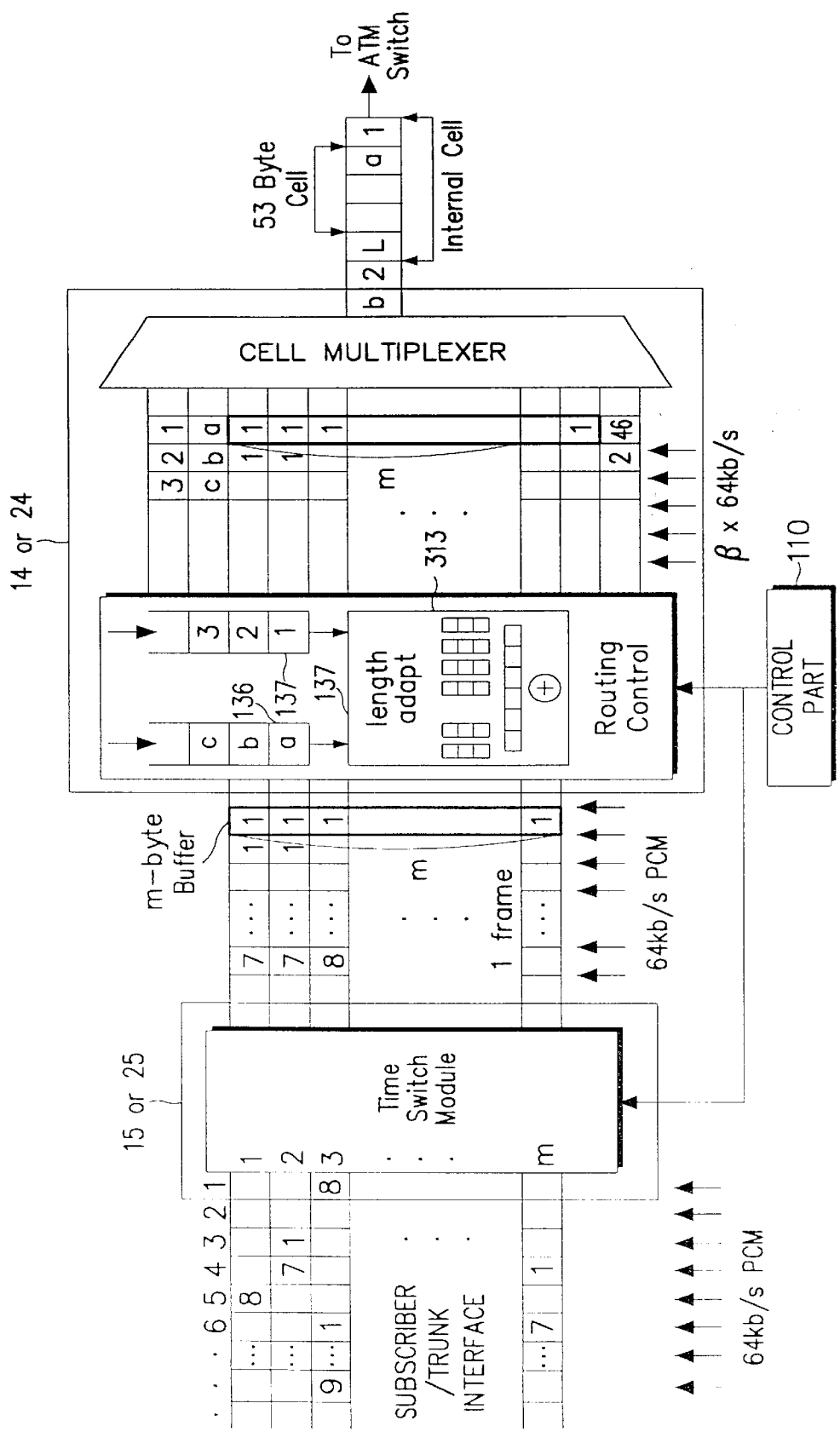
FIG. 5 schematically illustrates a time switch module and a CLAD shown in FIG. 4.

FIG. 5 is a block diagram of the time switch module 15 (or 25), and the CLAD 14 (or 24) of the ATM switching device of FIG. 4. Referring to FIG. 5, DS0 channels output from the time switch module 15 are sorted in an ascending order from the destination time switch module 65 by the control memory 13 in the time switch module 15. Control information of the control memory 13 is output from the controller 110 in a call set-up. The CLAD 14 receives the sub-highway streams from the time switch module 15, assembles the sub-highway streams into ATM cells, multiplexes the assembled ATM cells, and outputs the multiplexed ATM cells to the ATM switch 50. Numbers given to time slots over output sub-highways of the time switch module 15 indicate the numbers assigned to the destination time switch modules 65.

Figure 6:
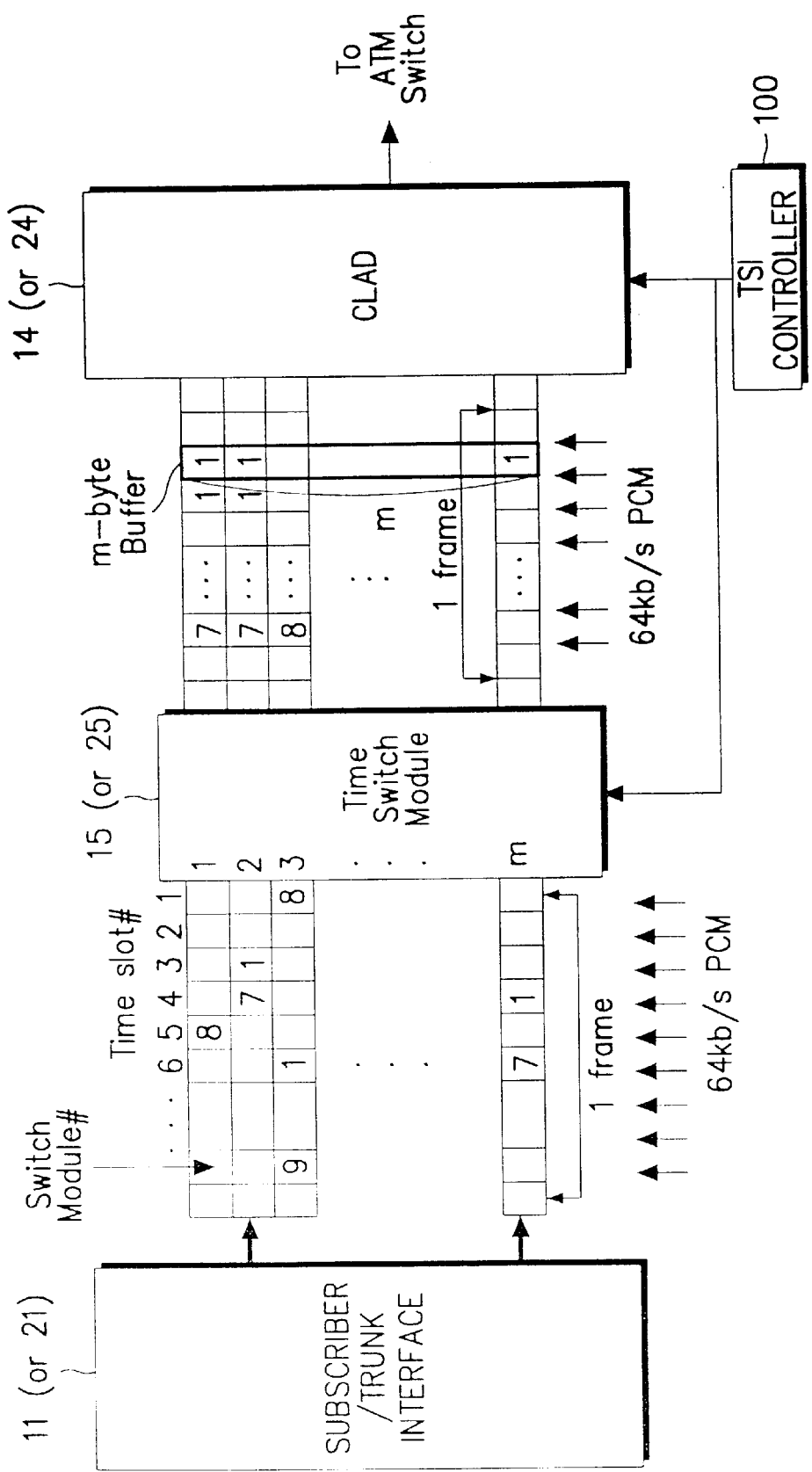
FIG. 6 schematically illustrates the time switch module shown in FIGS. 4 and 5.

FIG. 6 schematically illustrates the time switch module 15 (or 25) and 65 (or 75) shown in FIGS. 4 and 5. The time switch module employs the structure of a time switch module and a call controlling method in a general circuit switch. That is, DS0 channels in sub-highway streams multiplexed from 64-Kbps pulse code modulation (PCM) voice data are exchanged in a TSI method. Here, the controller 110 records control information for time-switching voice channels in the control memory 13 of the time switch module 15 in a call set-up, and the time switch 12 switches the stored voice data of DS0 channels in accordance with the control information.

The time switch module 15 (25, 65, or 75) according to the embodiment of the present invention performs the TSI function as follows.

Input conditions of the time switch module 15 are the same as those of a general circuit switch. That is, the time switch module 15 receives the voice channel data over several sub-highways, and a plurality of 64-Kbps DS0 voice channel data are multiplexed in each subway. In general, 32 DS0 channels are multiplexed and form a 2.048-Mbps frame in each sub-highway. To interchange the DS0 channels on the input sub-highways, the time switch module 15 interchanges time slots to sort the DS0 channels in an ascending order in accordance with time slots corresponding to the numbers of the destination time switch module 65. That is, data headed for the destination time switch module 65 of a small number are arranged in small-number time slots in sub-highways.

In FIG. 6, the cases where the destination time switch module 65 is numbered as #1, #7, and #8 are shown as an example. In this situation, any of the time slots under the same number in the entire sub-highways should not be empty. If the number of voice channel data headed for the destination time switch module 65 is smaller than the number of the sub-highways (m sub-highways in FIG. 5), cells headed for different destinations may be present in the time slots labeled with the same number in the sub-highways. This can be found in data of time slots 7 and 8 in FIG. 6. In this case, if the number of data headed for the destination time switch module 65 is larger than the number of the sub-highways, extra data is loaded on neighboring channels. In FIG. 6, the number of time slots 1 is larger than m. Here, m is both the number of the sub-highways and the number of time slots in a cell. This is because DS0 data headed for the destination time switch module 65 is grouped before it is transmitted. A plurality of grouped DS0 data is assembled into an identical cell by the CLAD 14, and transmitted to the output side.

Figure 7:
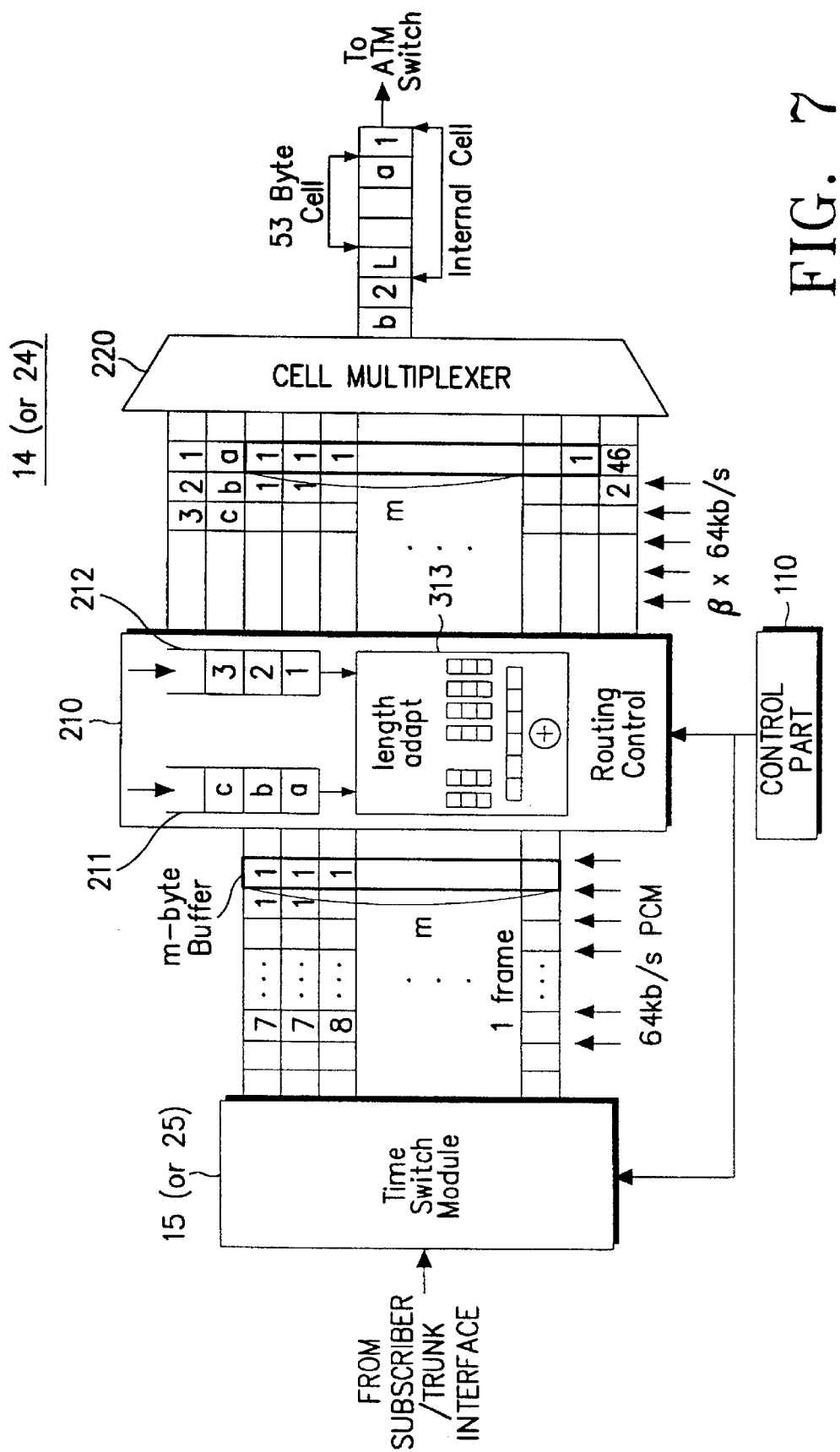
FIG. 7 schematically illustrates the CLAD shown in FIGS. 4 and 5.

FIG. 7 is a block diagram of the CLAD 14 (or 24) of the ATM switching device shown in FIGS. 4 and 5. The CLAD 14 groups 64-Kbps voice data of the sub-highways received from the time switch module 15 into data headed for the same destination, and assembles the grouped data into an identical ATM cell. Functioning in a manner opposite to that of the CLAD 14, the CLAD 64 disassembles a switched cell output from the time switch module 15 to a destination into voice channel data, and sends the disassembled voice channel data to the time switch module 65.

At the input side, the CLAD 14 includes a routing controller 210 for attaching a cell header and a routing tag to a payload of a cell filled with data to be transmitted, that is, DS0 data, copying cells, and indicating the valid data length of a cell, and CLAD 14 also includes a cell multiplexer 220 for multiplexing a cell output from the routing controller 210. The CLAD 64 at the destination side has a cell demultiplexer and a routing controller functioning in a manner opposite to that of the CLAD 14.

Referring to FIG. 7, the routing controller 210 has a cell header buffer 211 for storing cell headers represented by a, b, c, . . . , and a routing tag buffer 212 for storing routing tags represented by 1, 2, 3, . . . Each cell is given one cell header and one routing tag (e.g., a and 1, b and 2, c and 3, . . . ). These values are received from the controller 110 in a call set-up, and stored in the cell header buffer 211 and the routing tag buffer 212, respectively, until the call is released. The routing controller 210 expresses the valid data length of a cell payload in terms of the number of bytes. The operation of the routing controller 210 and the cell multiplexer 220 will now be described as follows.

Figure 8:
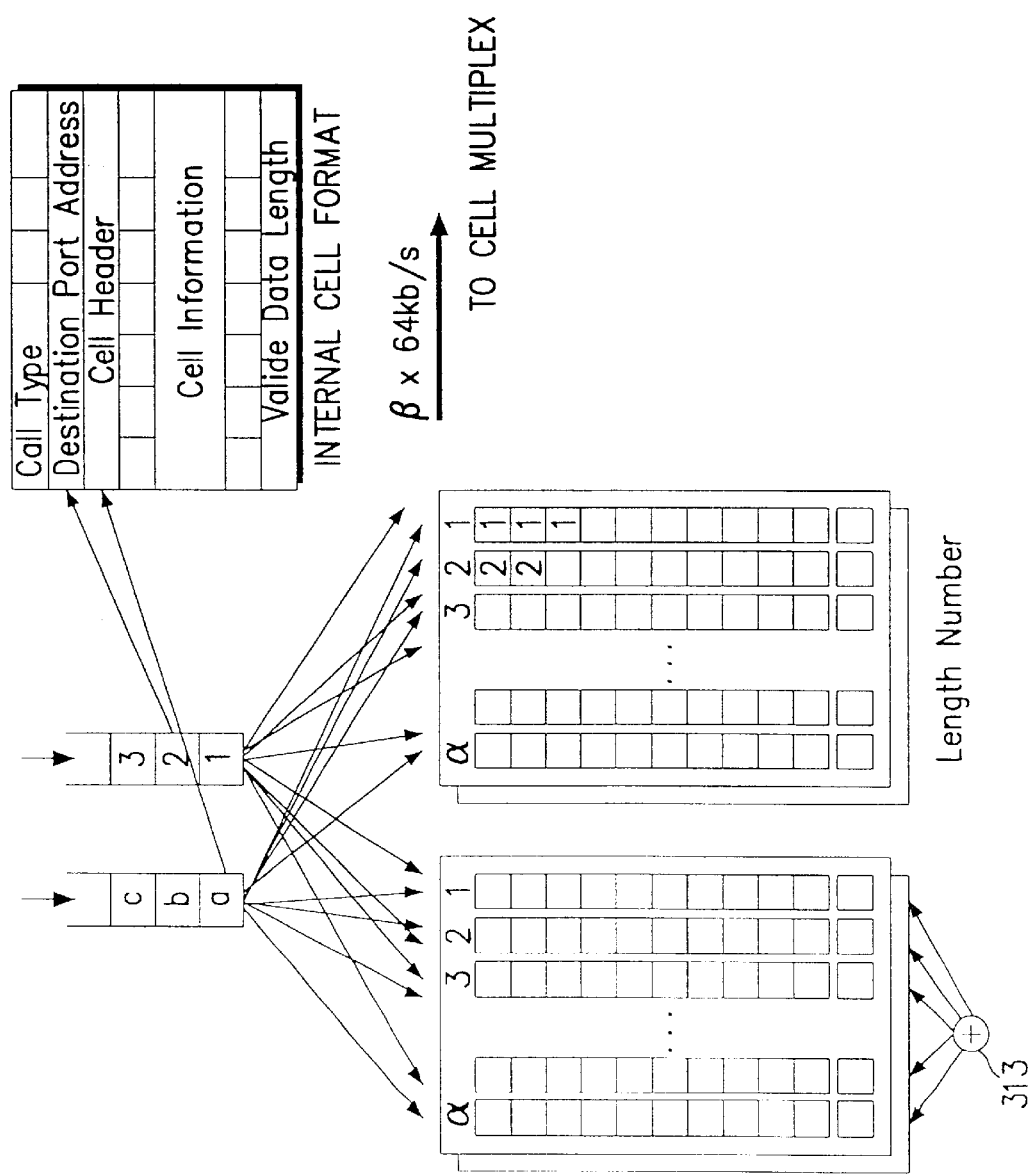
FIG. 8 is a block diagram of a routing controller shown in FIG. 5.

FIG. 8 is a block diagram of the routing controller 210 as shown in FIG. 7. Referring to FIG. 8, since DS0 data have already been grouped in accordance with their destinations in the time switch module 15 on the input side, the CLAD 14 assembles the data headed for the same destination into an identical ATM cell by just mapping DS0 data positioned in the same time slots of the respective sub-highways in the payload of the ATM cell. However, if data for different time switch modules 65 on the output side are mixed in a group as described above with reference to FIG. 6, these data should be separated from the group and new cells should be added in accordance with the different destinations. For example, if data are headed for five destinations, four cells are copied to make five cells, and each cell is adjusted to have data for the same destination. Therefore, assuming that the number of the destination time switch modules 65 is n, the routing controller 210 should be capable of copying (n−1) cells at maximum. As a result, the rate of 64 Kbps is increased by n times, which imposes constraints on the switching speed of the ATM switch 50.

The routing controller 210 receives cell header information and routing tag information from the controller 110 according to the operational result of the TSI controller 100 in a call set-up, and reserves the information until the call is released. These pieces of information are stored in the cell header buffer 211 and the routing tag buffer 212, respectively, and then added to a corresponding time slot in a sub-highway. Addition of the routing tag increases the operational speed of the ATM switch 50.

In assembling a cell, the valid data length of its cell payload should be indicated. This is expressed in terms of the number of bytes in the last byte of the cell payload, and removed by the CLAD 64 at the destination. In FIG. 8, the valid data length indicator is indicated by a trailer attached 313. In FIGS. 4, 5, 7, and 8, $\alpha$ indicates the number of time switch modules, and $\beta$ indicates the sum of the number of the time switch modules and the number of ASIMs and ATMs. These values depend on switch structure.

An internal cell format, including a cell header, a routing tag, and a valid data length output from the routing controller 210, is shown in Table 1.

TABLE 1

| call type |
| --- |
| destination module number |
| cell header (5 bytes) |
| cell payload (47 bytes) |
| valid data length indicator |

Call type in Table 1 indicates voice-voice call, voice-non-voice call, and so on.

The operation of the cell multiplexer 220 shown in FIG. 7 will be described hereinbelow. First, the cell multiplexer 220 multiplexes assembled cells output from the routing controller 210. An internal cell as shown in Table 1 includes a cell payload having data grouped from DS0 channels arranged in parallel, a cell header, and a routing tag. Thus, the cell switching speed is (cell payload+cell header+routing tag)×8 bits. Hence, the cell multiplexer 220 should multiplex the cell at the port speed of the ATM switch 50. The port speed of the ATM switch 50 varies in accordance with the structures of ATM switch.

Figure 9:
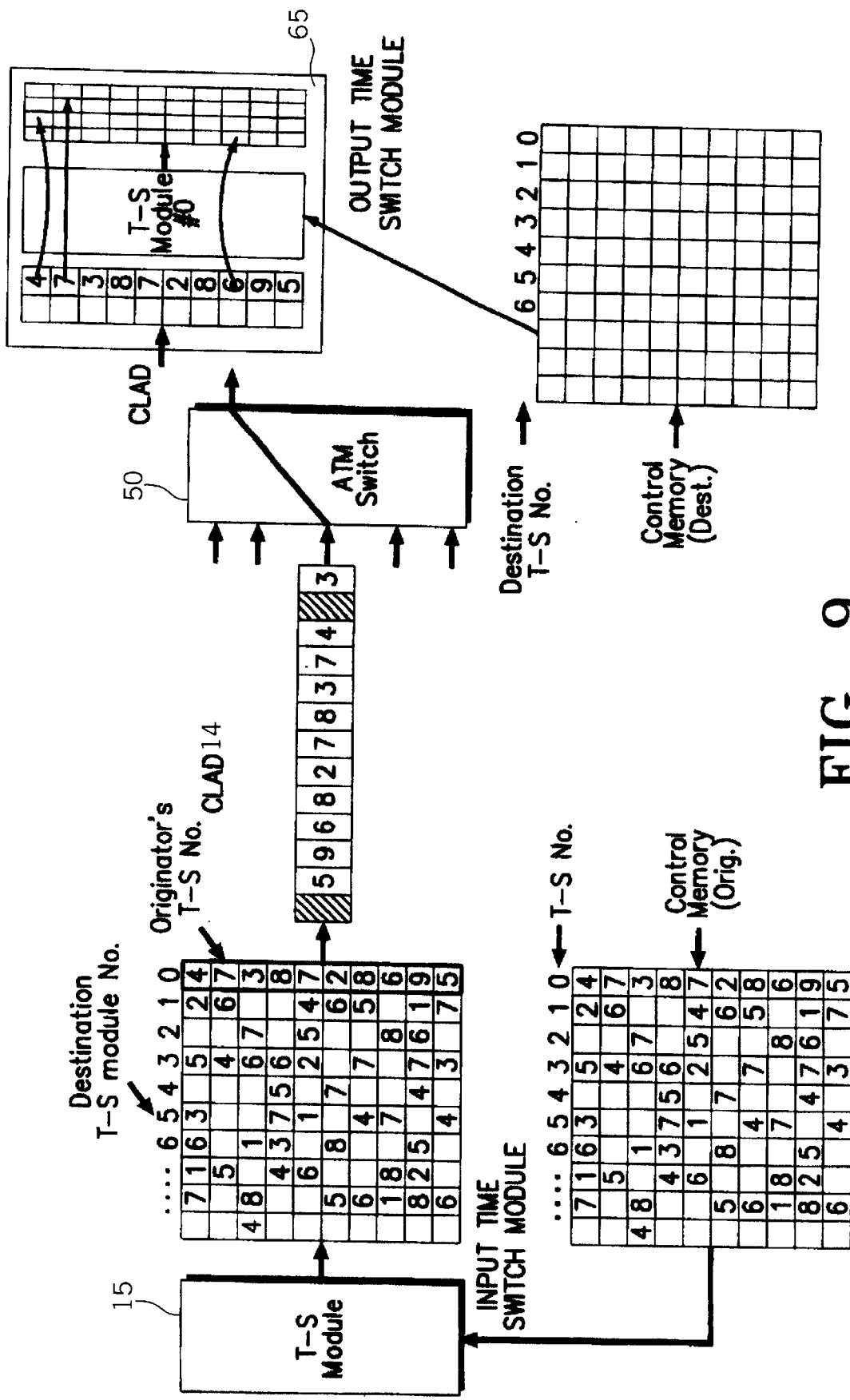
FIG. 9 illustrates a process of switching voice data in the ATM switching device shown in FIG. 4.

FIG. 9 illustrates a process of switching voice data in the ATM switching device as shown in FIGS. 4–8. Referring to FIG. 9, voice data loaded on DS0 channels in the sub-highways are switched through the input time switch module, the input CLAD, the ATM switch, the output CLAD, and the output time switch module. Tables of FIG. 9 represent control memories at the source and the destination, and indicate the numbers of calling parties to show time slot interchanges over the sub-highways. At the source, the control memory stores control information for controlling the input time switch (T-S) module. At the destination, the control memory is blanked, and the time slot number output by switching of time slot interchange (TSI) is written in the table.

In FIG. 9, data received in the input time switch module 15 are sorted so as to be headed for the destination time switch module 65. The input CLAD 14 assembles the sorted data groups into ATM cells by adding cell headers and routing tags to the data groups. The ATM cells are transmitted to the CLAD 64 and the time switch module 65 on the output side through the ATM switch 50. Then, the destination time switch module 65 performs the TSI function to transmit the voice data to the PSIM 61 or the PTIM 71 at the final destination. As shown in FIG. 9, circuit switching through TSI is performed in the same manner as general switching, and the ATM switch 50 also switches cells as in a general ATM switch. Both tables in the lower part of FIG. 9 indicate control information stored in control memories.

Figure 10:
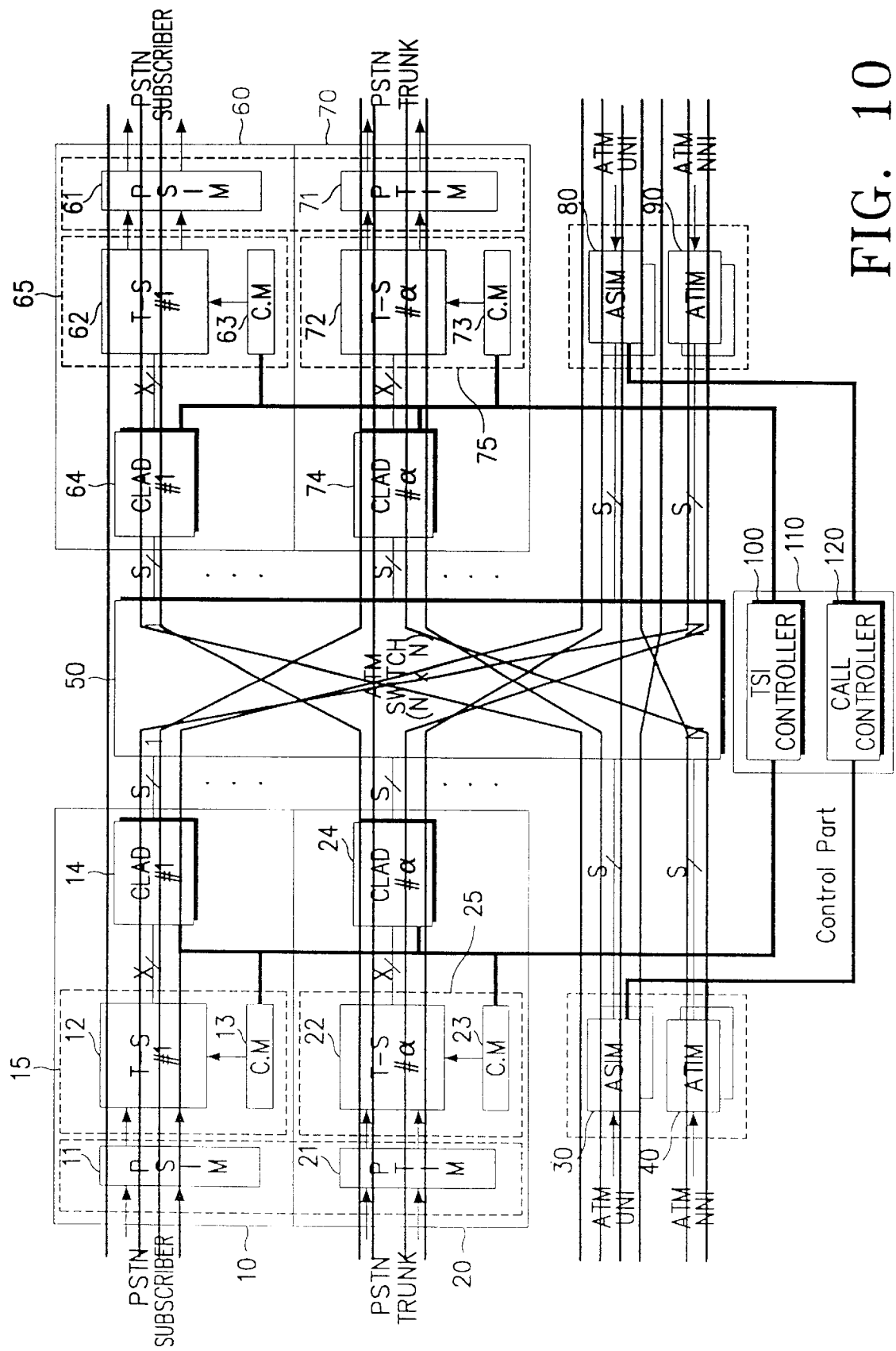
FIG. 10 illustrates types of call services between a general circuit switch and the ATM switching device according to the principles of the present invention.

FIG. 10 illustrates services provided in the ATM switching device according to the embodiment of the present invention. Here, to perform the services, the ATM switching device. should have software such as PSTN and ATM calls processing programs, number translation, and signaling. The ATM switching device of the present invention provides the following services:

(1) PSTN-PSTN call service. The PSTN-PSTN call service includes a PSTN to local call and a PSTN to trunk call;

(2) PSTN-ATM call service. The PSTN-ATM call service includes a PSTN to ATM local call, a PSTN to ATM trunk call, an ATM to PSTN local call, and an ATM to PSTN trunk call; and (3) ATM-ATM call service. The ATM-ATM call service includes an ATM to local call and an ATM to ATM trunk call.

As described above, the switching device according to the embodiment of the present invention has several advantages: (1) cell assembly delay is prevented, thus generating no echoes and obviating the need for an echo canceler; (2) the decrease of cell bandwidth efficiency is minimized; (3) development expense is saved by using current time slot interchange circuits or chips, and TSI control method; (4) both STM and ATM services are provided with a single switch; and (5) interworking functions (i.e., CLADs) are simple because a distributed interworking functioning method is used between STM and ATM.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An asynchronous transfer mode switching device for providing voice call service, comprising:

an input interface;

a destination interface;

input time switch modules connected to said input interface for switching channel data received over sub-highways to voice stream data grouped in accordance with destinations by sorting the received channel data according to time slots corresponding to numbers of destination time switch modules;

input cell assembly and disassembly modules connected to the input time switch modules, respectively, for assembling a group of voice data from the input time switch modules headed for the same destination into data cells;

an asynchronous transfer mode switch connected to the input cell assembly and disassembly modules for self-routing the data cells received from the input cell assembly and disassembly modules, for switching the data cells, and for outputting switched data cells to a corresponding destination;

destination cell assembly and disassembly modules connected to the asynchronous transfer mode switch for disassembling the data cells from the asynchronous transfer mode switch into voice stream data; and output time switch modules connected between the destination cell assembly and disassembly modules and said destination interface for interchanging time slots of the disassembled voice stream data according to destinations, and for outputting time-slot interchanged voice stream data to a corresponding destination interface.

2. The asynchronous transfer mode switching device of claim 1, said input interface and said destination interface each corresponding to a private switched telephone network interface for providing an interface with a private switched telephone network for voice call service.

3. The asynchronous transfer mode switching device of claim 1, each of the cell assembly and disassembly modules comprising:

a first routing controller for mapping time-slot data headed for the same destination in a payload of a data cell, for attaching a cell header and a routing tag to a cell payload, for copying a data cell, and for indicating a valid data length of the data cell;

a cell multiplexer for multiplexing the data cell assembled in the first routing controller, and for outputting the multiplexed data cell to the asynchronous transfer mode switch;

a cell demultiplexer for demultiplexing the data cell switched in the asynchronous transfer mode switch; and a second routing controller for removing the cell header and the routing tag from the demultiplexed data cell, for disassembling the data of the cell payload into voice stream data having a destination time switch module number, and for outputting the voice stream data over each of said sub-highways.

4. The asynchronous transfer mode switching device of claim 3, each of the input time switch modules interchanging time slots in order to sort channel data in an ascending order in accordance with time slots corresponding to destination time switch module numbers.

5. The asynchronous transfer mode switching device of claim 1, each of the input time switch modules interchanging time slots in order to sort channel data in an ascending order in accordance with time slots corresponding to destination time switch module numbers.

6. An asynchronous transfer mode switching device comprising:

input time switch modules connected to an input interface to switch channel data received over sub-highways to voice stream data grouped in accordance with destinations by sorting the received channel data according to time slots corresponding to numbers of destination time switch modules;

input cell assembly and disassembly modules for assembling a group of voice data from the input time switch modules headed for the same destination into data cells;

an input asynchronous transfer mode interface for interfacing the data cells received from one of an asynchronous transfer mode subscriber and an asynchronous transfer mode network;

an asynchronous transfer mode switch connected to the input cell assembly and disassembly modules and the input asynchronous transfer mode interface for self-routing the data cells received from the input cell assembly and disassembly modules and the input asynchronous transfer mode interface, for switching the data cells, and for outputting the switched data cells to corresponding destinations;

destination cell assembly and disassembly modules for disassembling switched data cells received from the asynchronous transfer mode switch into voice stream data;

output time switch modules connected between the destination cell assembly and disassembly modules and a destination private switched telephone network interface to interchange time slots of the disassembled voice stream data according to destinations, and to output each of the time-slot interchanged voice stream data to a corresponding private switched telephone network interface; and an output asynchronous transfer mode interface for interfacing switched data cells received from the asynchronous transfer mode switch to one of a destination asynchronous transfer mode subscriber and a destination asynchronous transfer mode network.

7. The asynchronous transfer mode switching device of claim 6, each of the cell assembly and disassembly modules comprising:

a first routing controller for mapping time-slot data headed for the same destination in a payload of a data cell, for attaching a cell header and a routing tag to the cell payload, for copying a data cell, and for indicating a valid data length of the data cell;

a cell multiplexer for multiplexing the data cell assembled in the first routing controller, and for outputting multiplexed data cell to the asynchronous transfer mode switch;

a cell demultiplexer for demultiplexing the data cell switched in the asynchronous transfer mode switch; and a second routing controller for removing the cell header and the routing tag from the demultiplexed data cell, for disassembling the data of the cell payload into voice stream data having a destination time switch module number, and for outputting the voice stream data over each sub-highway.

8. The asynchronous transfer mode switching device of claim 6, each of the input time switch modules interchanging time slots in order to sort channel data in an ascending order in accordance with time slots corresponding to destination time switch module numbers.

9. The asynchronous transfer mode switching device of claim 7, each of the input time switch modules interchanging time slots in order to sort channel data in an ascending order in accordance with time slots corresponding to destination time switch module numbers.

10. An asynchronous transfer mode switching method for switching voice channels in an asynchronous transfer mode switching device, comprising the steps of:

switching channel data to voice stream data grouped in accordance with destinations by sorting the received channel data according to time slots corresponding to numbers of destination time switch modules;

assembling a group of voice data headed for the same destination into an identical data cell;

self-routing the assembled data cell, switching the data cell, and outputting the switched data cell to a corresponding destination;

disassembling the switched data cell into stream data; and interchanging time slots of the disassembled stream data according to destinations, and outputting each of the time-slot interchanged stream data to a corresponding destination interface.

11. The asynchronous transfer mode switching method of claim 10, said assembling step comprising:

mapping time-slot data headed for the same destination in a payload of a data cell, attaching a cell header and a routing tag to the payload of the data cell, copying the data cell, and indicating a valid data length of the data cell; and multiplexing the assembled data cell, and outputting the multiplexed data cell.

12. The asynchronous transfer mode switching method of claim 10, said disassembling step comprising:

demultiplexing the switched asynchronous transfer mode cell; and removing the cell header and the routing tag from the demultiplexed asynchronous transfer mode cell, disassembling the data of the payload into stream data having a destination time switch module number, and outputting the voice stream data over each sub-highway.

13. An asynchronous transfer mode switching device for providing voice call service, comprising:

input time switch modules connected to an input public switched telephone network for grouping received DS channel data according to same destinations, and for sorting the grouped DS channel data in time slots of a corresponding highway, thereby applying the sorted DS channel data according to said same destinations as an output;

a cell assembly module for assembling said DS channel data grouped according to said same destinations for output by said input time switch modules into an asynchronous transfer mode cell;

an input asynchronous transfer mode interface for interfacing asynchronous transfer mode cells received from an asynchronous transfer mode subscriber and an asynchronous transfer mode switching network;

an asynchronous transfer mode switch connected to said cell assembly module and to said input asynchronous transfer mode interface for self-routing said asynchronous transfer mode cell for switching the asynchronous transfer mode cell, and for outputting the switched asynchronous cells to a corresponding destination;

a cell disassembly module for inputting asynchronous transfer mode cells to be output to the input public switched telephone network switched in said asynchronous transfer mode switch, and for disassembling said asynchronous transfer mode cells into DS stream data so as to thereby output disassembled DS channel data to time slots of highways of destinations;

output time switch modules connected between said cell disassembly modules and said input public switched telephone network interface for interchanging time slots of said disassembled DS channel data according to destinations, and for outputting time-slot interchanged voice stream data to the input public switched telephone network; and output asynchronous transfer mode interfaces connected between said asynchronous transfer mode switch, asynchronous transfer mode subscribers and an asynchronous transfer mode switch network for outputting an asynchronous transfer mode cell switched in said asynchronous transfer mode switch to a corresponding asynchronous transfer mode subscriber and a corresponding asynchronous transfer mode switch network.

14. The asynchronous transfer mode switching device of claim 13, wherein said device provides an interface with a private switched telephone network for voice call service.

15. The asynchronous transfer mode switching device of claim 13, said cell assembly module comprising:

an assembly routing controller for grouping time slot data to be output over a sub-highway according to said same destinations, for mapping grouped time-slot data in a payload of an asynchronous transfer mode cell for attaching a cell header and a routing tag to said payload, and for copying a cell and indicating a valid data length of the cell; and a cell multiplexer for multiplexing in parallel an asynchronous transfer mode cell assembled in said assembly routing controller at a speed of said asynchronous transfer mode switch port, and for outputting the multiplexed data cell to the asynchronous transfer mode switch; and said cell disassembly module comprising:

a cell demultiplexer for disassembling the multiplexed asynchronous transfer mode cell in series switched in said asynchronous transfer mode switch, and for demultiplexing the disassembled data cell; and a disassembly routing controller for removing the cell header and the routing tag from said demultiplexed cell for disassembling data of the cell payload into voice stream data having numbers of a destination time switch module, and for outputting the voice stream data over each highway of the corresponding destination.

16. The asynchronous transfer mode switching device of claim 14, said input time switch modules interchanging time slots in order to sort channel data in ascending order in accordance with time slots corresponding to the destination time switch module numbers of DS channels to be input over each highway.

17. The asynchronous transfer mode switching device of claim 13, each of the input time switch modules interchanging time slots in order to sort channel data in an ascending order in accordance with time slots corresponding to destination time switch module numbers.

18. The asynchronous transfer mode switching device of claim 13, said time switch modules interchanging time slots in order to sort channel data in ascending order in accordance with time slots corresponding to the destination time switch module numbers of DS channels to be input over each highway.

19. An asynchronous transfer mode switching method for switching voice channels in an asynchronous transfer mode switching device, comprising the steps of:

time switching channel data by sorting DS channel data received over each of a plurality of highways of an input public switched telephone network interface in time slots of said each highway headed for a same destination, and for grouping time slots of said DS channel stream data sorted according to said destinations based on time slots of highways corresponding to the destinations;

assembling the grouped data into an asynchronous transfer mode cell so that said DS channel data grouped according to said same destinations is output to said same destination;

self-routing said input asynchronous transfer mode cell, and switching self-routed data according to corresponding destinations, thereby outputting a switched result to an asynchronous transfer mode switching network;

disassembling the asynchronous transfer mode cells grouped according to said destination into DS channel stream data, and outputting highways of the destination when receiving asynchronous transfer mode cells to be output to the input public switched telephone network received from said asynchronous transfer mode switching network; and switching time slots according to a destination of said disassembled DS channel stream data, and outputting a switched result to said input public switched telephone network interface.

20. The asynchronous transfer mode switching method of claim 19, said step of assembling the grouped data comprising:

grouping time-slot data to be output from said each sub-highway according to said same destination, mapping the grouped data in a payload of an asynchronous transfer mode cell, attaching a cell header and a routing tag to said cell payload, copying a cell, and indicating a valid data length of the cell; and multiplexing said asynchronous transfer mode cell in parallel at a speed of the asynchronous transfer mode switching, and outputting the multiplexed data cell.

21. The asynchronous transfer mode switching method of claim 20, said step of disassembling the asynchronous transfer mode cells, comprising:

demultiplexing the multiplexed asynchronous transfer mode cell in series so as to be transmitted to the input public switched telephone network in said asynchronous transfer mode switching process into a parallel form; and removing the cell header and the routing tag from the demultiplexed asynchronous transfer mode cell, disassembling the data of the cell payload into stream data having a destination time switch module number, and outputting the stream data over said each sub-highway of a corresponding destination.

* * * * *